UNITED STATES PATENT OFFICE.

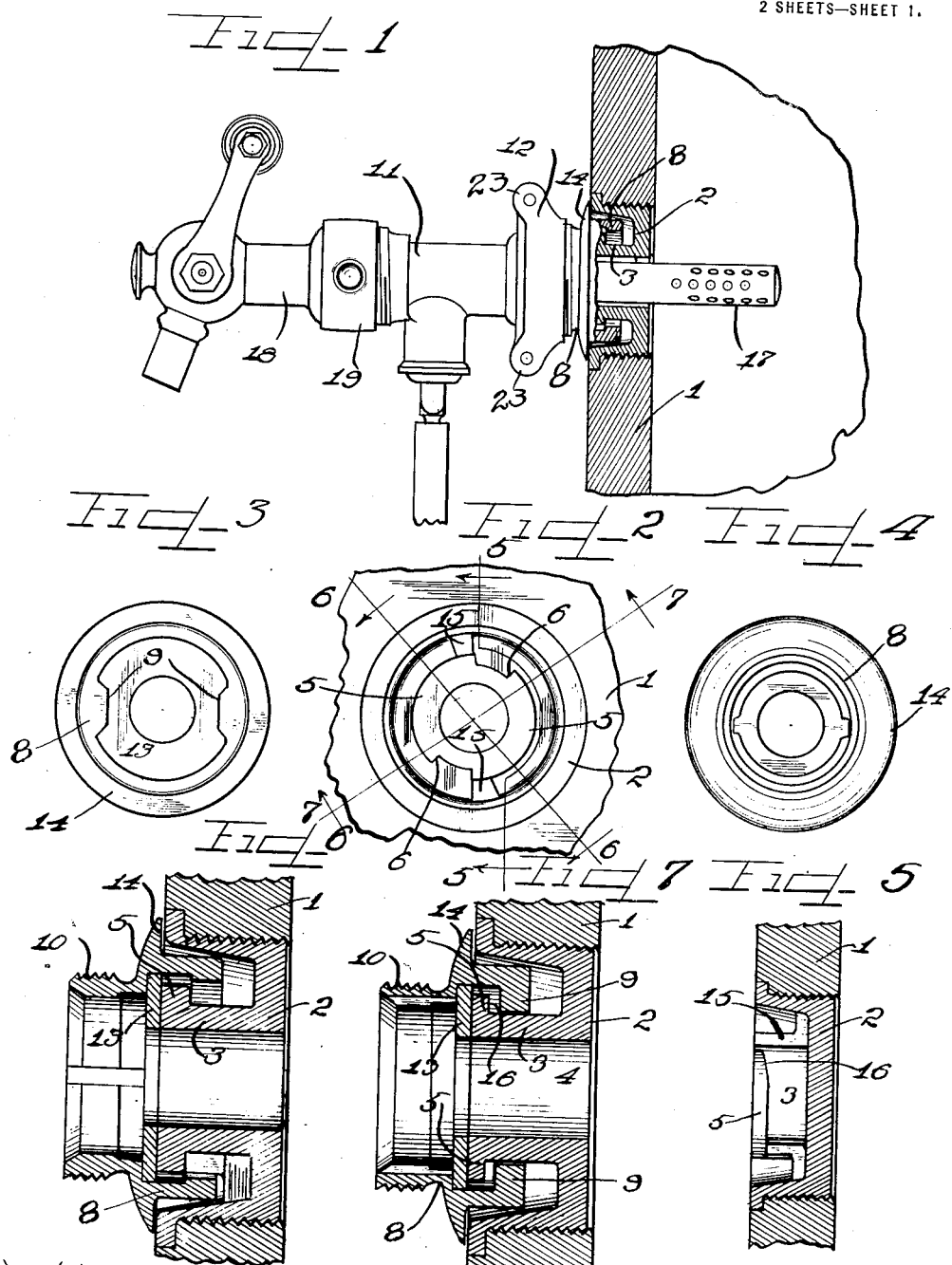

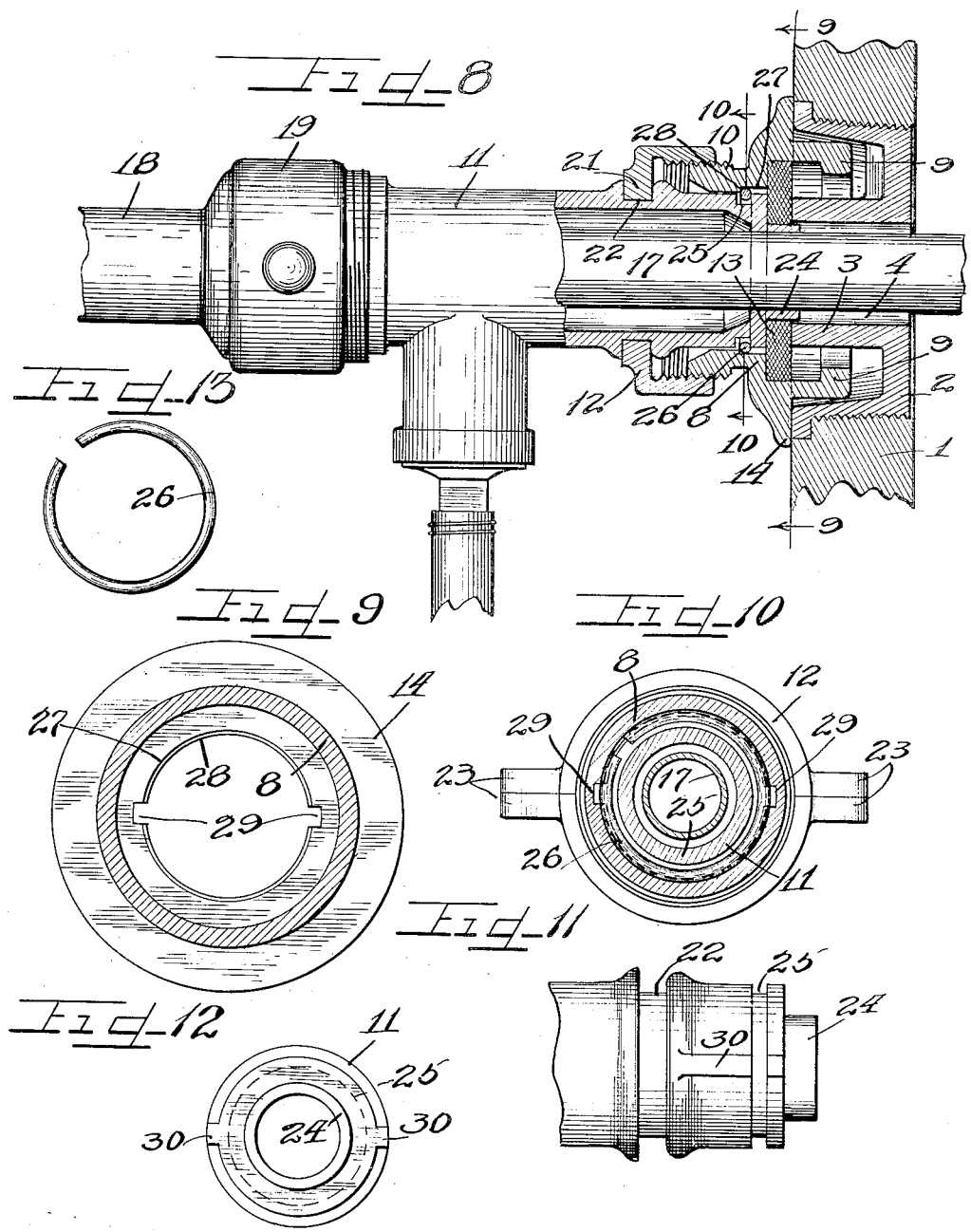

FRANK E. RICE, OF DETROIT, MICHIGAN, ASSIGNOR TO AMERICAN TAP BUSH CO., OF DETROIT, MICHIGAN, A CORPORATION OF MICHIGAN.

TAP-ATTACHING THIMBLE.

1,329,141.   Specification of Letters Patent.   Patented Jan. 27, 1920.

Application filed October 26, 1918. Serial No. 259,887.

*To all whom it may concern:*

Be it known that I, FRANK E. RICE, a citizen of the United States, and a resident of the city of Detroit, in the county of Wayne and State of Michigan, have invented certain new and useful Improvements in Tap-Attaching Thimbles; and I do hereby declare that the following is a full, clear, and exact description of the same, reference being had to the accompanying drawings, and to the numerals of reference marked thereon, which form a part of this specification.

My invention has reference more particularly to a detachable thimble or intermediate connecting ring for use with a bung hole bushing to attach a tap or draw-off valve thereto.

An object of my invention is to provide an improved type of intermediate connector or thimble whereby a tap is secured to a bung hole bushing in a better and more convenient manner than heretofore.

Another object of my invention is to provide an intermediate connector or thimble for attaching a tap to a bung hole bushing, in which the thimble is adapted to be secured rigidly in a fixed position previous to the clamping of the tap in place.

Another object of my invention is to provide an intermediate connector or thimble for attaching a tap to a bung hole bushing, in which the thimble has a bayonet joint connection with the bung hole bushing and an annular flange adapted to be drawn down against the bung hole bushing by means of the bayonet joint attachment to provide a rigid connection and thereby hold the tap which is secured to the connector in position to effect a tight joint with the bung hole bushing.

Another object of my invention is to provide a thimble for connecting a tap to a bung hole bushing, which thimble is loosely carried by the tap and adapted to be secured to the bung hole bushing and then afford adjustment of the tap with reference to the bushing to effect a tight joint therebetween.

My invention also has other important objects which will appear from the following specification and the accompanying drawings, in which I have described and shown my invention in a preferred form.

On the drawings:

Figure 1 is a side view partly in section showing a tap connected with a bung hole bushing in accordance with my invention.

Fig. 2 is an outer side view of the bung hole bushing.

Fig. 3 is an inner end view of the intermediate connector or thimble.

Fig. 4 is an outer end view thereof.

Fig. 5 is a sectional view on the line 5—5 of Fig. 2.

Fig. 6 is a view on the line 6—6 of Fig. 2, showing the intermediate connector or thimble in place on the bung hole bushing before being turned to the locking position.

Fig. 7 is a sectional view on the line 7—7 of Fig. 2, showing the intermediate connector or thimble partially turned to the locking position.

Fig. 8 is an enlarged fragmentary side view of the tap with the connecting means in section and showing the manner of retaining the thimble on the tap.

Fig. 9 is a transverse sectional view on the line 9—9 of Fig. 8.

Fig. 10 is a similar view on the line 10—10 of Fig. 8.

Fig. 11 is a view of the inner end of the tap with the attaching means omitted.

Fig. 12 is a view looking at the right hand side of the part shown in Fig. 11.

Fig. 13 shows the expansible ring for holding the attaching thimble on the tap.

As shown on the drawings:

The reference numeral 1 indicates the wall of a keg or other container which has the bung hole bushing 2, threaded into an opening in said wall. The outer face of this bushing 2, is flush with the outer face of the wall 1, and is centrally perforated to provide a discharge opening therethrough from the interior of the container, and is provided with an annular recess in the outer face so as to form a central sleeve 3, extending outwardly and surrounding the opening 4, which said sleeve is provided at the outer end with an annular flange 5, which is notched or cut away in diametrically opposite places as at 6, to provide for a bayonet joint connection of the connector ring or thimble 8, therewith.

Said connector ring has a pair of diametrically opposite inturned lugs 9, at the inner end thereof, which may be slipped through the notches 6, of the flange 5, and then turned to engage under the flange 5, to prevent withdrawal of the ring 8, from the sleeve 3. The outer end of the coupling ring 8, is externally threaded as at 10, to afford a clamping connection for the barrel 11 of a tap, which barrel has an internally threaded clamping ring 12, loosely mounted thereon to engage the threaded outer end 10, of the coupling ring 8, and force the inner end of the tap 11, against the outer end of the sleeve 3. A rubber gasket or washer 13, is mounted on an extension 24 at the inner end of the barrel 11, which extension is of reduced diameter so as to project into the opening through the bushing sleeve 3, and this gasket is embraced by the wall of the enlarged inner end of the coupling ring 8 and is prevented from separation therefrom by the inturned lugs 9, at the inner end of the coupling ring. When the connector ring 8, is inserted in place on the sleeve 3, the washer 13, is directly in front of the outer end of the sleeve 3, in proper position to be clamped squarely between the inner end of the barrel 11, and the outer end of the sleeve 3, when the tap is forced thereagainst by means of the coupling 12, and thereby effects a tight joint or connection of the tap with the bung hole bushing.

Heretofore the intermediate connector for attaching the tap to the bung hole bushing has been arranged to loosely engage the bung hole bushing and the tightening of the tap against the outer end of the sleeve 3, was depended on to draw the connector outwardly against the flange 5, to furnish a substantial mounting for the tap. With such construction, however, owing to the wabbly condition of the connector, the tap occasionally did not draw up in perfect alinement with the sleeve 3, or the washer 13, became pinched or dislocated so that a tight joint was not effected, and also owing to the fact that the engagement of the intermediate connector with the flange 5, of the bung hole bushing was effected by comparatively narrow lugs such as 9, in the present illustration, a perfectly rigid connection was not possible when the attachment was completed as the resilience of the bushing 13, and engagement of the lugs with the flange 5, permitted lateral swinging or play of the tap 11, which was undesirable.

In order to effect a firm connection of the intermediate connector with the bung hole bushing and to obviate any opportunity of looseness or wabbling, and to insure the inner end of the tap 11, being forced squarely against the outer end of the sleeve 3, and washer 13, thereon, I have provided the intermediate connector 8, with an annular flange 14, which when the connector is inserted on the sleeve 3, and turned so that the lugs 9, engage properly under the flange 5, is drawn down tight against the outer end of the bushing 2, and a firm connection therewith effected.

To facilitate the placing of the connector on the sleeve 3, said sleeve is provided at the outside thereof and immediately adjacent one end of each notch 6, with a rib 15, which serves as a stop to prevent turning of the connector 8, on the sleeve in an improper direction, and also serves to prevent turning of the lugs 9, beyond engagement with the section of the flange 5, with which the lugs are adapted to be engaged, and the under face of each flange 5, immediately adjacent the notch 6, and at the opposite side thereof from the rib 15, is beveled as at 16, to draw the lugs 9, downwardly under the flange 5, when the intermediate connector 8, is inserted in position and turned.

It is not necessary that the inclined faces 16, and lugs 9, should be arranged so that the flange 14, engages the outer face of the bung hole bushing, while the lugs 9 are engaged against the inclined faces 16, of the flange 5, so as to thereby draw the flange 14, tight against the outer end of the bushing, but it is sufficient that when the lugs 9, are locked under the flange 5, the flange 14, is held in sufficiently close engagement so that looseness of the intermediate connector 8, is avoided. This result may also be accomplished otherwise than by using the flange 14,—for example, the inner end of the connector 8, may be arranged to seat against the bottom of the annular groove in the bung hole bushing or may engage the lateral walls of the annular groove to hold the connector securely in position, or may be otherwise constructed to serve the purpose of holding the connector 8, firmly in position and in proper alinement with the sleeve 3, so that the inner end of the tap 11, comes square against the outer end of the sleeve and washer thereon.

The clamping ring 12 is swiveled on the inner end of the barrel 11 of the tap by means of an inturned flange 21 on the ring 12, which engages an annular groove 22, adjacent the inner end of the barrel, and it is customary to construct the ring 12 of two half sections to enable the aforesaid connection to be made, and to secure the half sections together by riveting or otherwise joining together matching ears 23 thereof, and these ears also afford a convenient grip for turning the ring on the threaded end of the connector 8.

In normal operation it is unnecessary to entirely separate the clamping ring 12 from engagement with the threaded outer end of the connector ring 8, as it is sufficient to merely relax the pressure on the gasket 13 so that the connector ring 8 is free to turn, and it is advantageous to retain the clamping ring engaged with the threaded end 10 of the connector ring 8, so that it is unnecessary to start the threads each time the tap is attached.

In order to retain the ring 8 connected with the barrel, a groove 25 is provided adjacent the inner end of the barrel 11 for an expansible ring 26 which, when inserted in the ring 8, springs into engagement with an annularly enlarged seat 27, in the reduced front end of the connector ring 8, which said annular seat is of sufficient width to permit the required relative movement of the tap barrel 11 and the ring 8 and has a shoulder 28 at the outer side thereof to engage the expansible ring 26 and prevent separation of the ring 8 from the barrel 11 and restrict their movement so that the clamping ring 12 will not be disengaged from the threaded end 10 of the connector ring 8, when it is adjusted to permit removal of the tap from the bushing 2.

One or more axially extending grooves 29 are provided in the bore of the reduced portion 10 and are engaged by corresponding ribs 30 on the surface of the inner end of the barrel 11 so that the ring 8 and barrel 11 may move axially with reference to one another, but are held to turn together, so that in applying the tap to and removing it from the bushing 2, the barrel of the tap may be gripped and turned to effect the connection or disconnection.

The tap is made separable, that is it consists of the barrel 11 and valve 18, to which the tube 17 is connected, said tube being adapted to project through the barrel 11, and being long enough so as to be inserted into the container 1, and the valve and tube are detachably connected with the barrel 11, by means of the threaded coupling 19.

The operation is as follows:

After the container 1, has been filled, a cork or plug is placed in the opening 4. When the contents of the container are to be drawn off, the valve and tube 18—17 are first removed from the barrel 11, and said barrel, with the intermediate connector 8 thereon, and the clamping ring 12 unscrewed until the expansion ring engages the shoulder 28, is first placed in position so that the connector 8 engages on the sleeve 3,—the lugs 9 thereof being inserted through the notches 6, after which the tap barrel and connector are given a right- hand turn so that the lugs 9, are moved under the flange 5, and the flange 14 is held close against the outer face of the bung hole bushing 2, so that the connector 8 is rigidly supported thereon. The washer 13 is thus held squarely in front of the outer end of the sleeve or hub 3. The clamping ring 12 is then screwed down onto the threaded end 10 of the coupling ring 8 and thereby forces the inner end of the barrel 11 against the washer 13, and clamps the latter against the outer end of the sleeve 3, so that a tight joint is effected between the inner end of the barrel 11, and the bung hole bushing. The valve proper 18, and stem 17, are then inserted in place, the latter being driven inwardly to force the cork or plug from the opening 4, in the bung hole, and the connecting means 19 is turned on the outer end of the barrel 11 to connect the valve 18 thereon, whereupon the device is ready for use.

While I have shown and described my invention in a preferred form, I am aware that various changes and modifications may be made therein without departing from the principles of my invention, and I therefore do not purpose limiting the patent granted hereon otherwise than necessitated by the prior art.

I claim as my invention:

1. The combination with a bushing having an opening therethrough and a detachable valve member therefor, of an intermediate connector having a bayonet joint connection with the bushing and an annular flange adapted to engage the outer face of the bushing to hold the intermediate connector in alinement with the opening in the bushing, a seat on the bushing within the intermediate connector, a gasket on the seat, and threaded means for connecting the valve member with the intermediate connector and forcing the inner end of the valve member against the gasket on the seat of the bushing.

2. The combination with a tap, of attaching means therefor comprising a connector ring loosely but non-detachably mounted on the tap casing for restricted axial movement relative thereto and adapted to be detachably secured to a support and adjusting means having a threaded connection whereby the ring and tap casing are relatively adjustable and which said connection is permanently maintained throughout the said restricted axial movement.

3. The combination with a support having an opening therethrough, of a detachable valve member therefor comprising a tubular casing, a connector on the casing and movable axially thereof and adapted to be detachably connected with the support to hold the tubular casing in position to afford a connected passageway through said opening and the tubular casing, a gasket at the end of the casing, adjusting means having a threaded connection for adjusting the casing axially with reference to the connector so as to compress the gasket between the end of the casing and the rim of the opening of the support, and means for limiting relative movement of the casing and connector so as to maintain said threaded connection throughout such movement and prevent detachment of the casing and connector at all times.

4. The combination with a tubular casing and valve therefor, of attaching means therefor comprising a connector mounted on the inner end of the casing to slide axially thereon and held from rotation thereon, an adjusting member having a threaded connection for adjusting the connector axially, and a resilient annular member interposed between the casing and connector so as to limit the axial movement of one with reference to the other and prevent detachment of the casing and connector at all times.

5. The combination with a support having an opening therethrough, of a detachable tubular member adapted to register with the opening and comprising a connector keyed on the inner end of the tubular member to slide axially thereon and having a bayonet joint connection with the support for holding the member so as to register with the opening in the support, a gasket interposed between the inner end of the member and the rim of the opening, a rotatable clamping member having a threaded connection for adjusting the member axially of the aforesaid connector so as to compress the gasket between the inner end of the member and the rim of the opening and effect a tension on the said bayonet joint connection, and means for limiting the relative axial movement of the member and connector to maintain the threaded connection of the clamping member throughout the range of said axial adjustment and prevent detachment of the casing and connector at all times.

In testimony whereof I have hereunto subscribed my name in the presence of two subscribing witnesses.

FRANK E. RICE.

Witnesses:
   EARL M. HARDINE,
   CHARLES W. HILLS, Jr.